US007230920B1

(12) United States Patent
Stratigakis

(10) Patent No.: US 7,230,920 B1
(45) Date of Patent: Jun. 12, 2007

(54) SYSTEM AND METHOD FOR OPTIMIZING THROUGHPUT USING RESPONSE TIME AS A METRIC

(75) Inventor: John G. Stratigakis, Medina, OH (US)

(73) Assignee: Cisco Technology, Inc., San Jose, CA (US)

( * ) Notice: Subject to any disclaimer, the term of this patent is extended or adjusted under 35 U.S.C. 154(b) by 1230 days.

(21) Appl. No.: 09/953,139

(22) Filed: Sep. 14, 2001

(51) Int. Cl.
*H04L 12/26* (2006.01)
*H04Q 7/24* (2006.01)
*H04Q 7/20* (2006.01)
*G06F 15/173* (2006.01)

(52) U.S. Cl. ............... 370/230; 370/332; 370/338; 455/453; 709/225

(58) Field of Classification Search ........ 370/328–338; 455/432.1–453; 709/223–226
See application file for complete search history.

(56) References Cited

U.S. PATENT DOCUMENTS

| 5,276,680 | A | | 1/1994 | Messenger | ............... 370/85.1 |
|---|---|---|---|---|---|
| 5,815,811 | A | * | 9/1998 | Pinard et al. | ............... 455/434 |
| 5,987,062 | A | * | 11/1999 | Engwer et al. | ............ 375/225 |
| 6,088,591 | A | * | 7/2000 | Trompower et al. | ........ 455/438 |
| 6,640,253 | B2 | * | 10/2003 | Schaefer | ................... 709/248 |

\* cited by examiner

*Primary Examiner*—Chi Pham
*Assistant Examiner*—Tri H. Phan
(74) *Attorney, Agent, or Firm*—Tucker Ellis & West LLP

(57) ABSTRACT

In a wireless local area network, a system and method for association between access points and clients based upon measuring the response time of packets and selecting the access point with the least latency. The present invention also contemplates taking the average response time of several packets between an access point and client and selecting the access point for association with the least amount of latency based upon the average response time. The present invention is further directed to optimizing throughput by user selectable or dynamically allocable trigger events which causes the client of an associated access point to seek other access points meeting the threshold limits. Finally, since the present invention causes the a client to seek an access point based on measuring the response time of packets, an effective and efficient system and method is disclosed to overcome external radio frequency interference.

17 Claims, 3 Drawing Sheets

SYSTEM AND METHOD FOR OPTIMIZING THROUGHPUT USING RESPONSE TIME AS A METRIC

FIELD OF INVENTION

The present invention relates generally to a system and method for optimizing throughput using response time as a metric in a wireless local area network consisting of a plurality of access points. More particularly, the present invention is directed towards association of a client with an access point and data transfer between a client and an access point using response time as the primary metric.

BACKGROUND OF THE INVENTION

The use of wireless networks has increased dramatically over the past few years. Wireless local area networks ("WLANs") are now commonplace in the modern workplace. A WLAN offers several advantages over regular wired local area networks ("LANs"). For example, users are not confined to specified locations previously wired for network access, wireless work stations are relatively easy to link with an existing LAN without the expense of additional cabling or technical support; and WLANs provide excellent alternatives for mobile or temporary working environments.

In general there are two types of WLANs, independent and infrastructure WLANs. The independent, or peer-to-peer, WLAN is the simplest configuration and connects a set of personal computers with wireless adapters. Any time two or more wireless adapters are within range of each other, they can set up an independent network. In infrastructure WLANs, multiple access points link the WLAN to the wired network and allow users to efficiently share network resources. The access points not only provide communication with the wired network, but also mediate wireless network traffic in the immediate neighborhood. Both of these network types are discussed extensively in the IEEE 802.11 standard for WLANs.

In the majority of applications, WLANs are of the infrastructure type. That is, the WLAN typically includes a number of fixed access points, also known as base stations, interconnected by a cable medium to form a hardwired network. The hardwired network is often referred to as a system backbone and may include many distinct types of nodes, such as, host computers, mass storage media, and communications ports. Also included in the typical WLAN are intermediate base stations which are not directly connected to the hardwired network.

These intermediate access points, often referred to as wireless base stations, increase the area within which access points connected to the hardwired network can communicate with mobile terminals. Associated with each access point or base station is a geographical cell. A cell is a geographic area in which an access point has sufficient signal strength to transmit data to and receive data from a mobile terminal with an acceptable error rate. Unless otherwise indicated, the term access point or base station, will hereinafter refer to access points hardwired to the network and wireless base stations. Typically, the access point connects to the wired network from a fixed location using standard Ethernet cable, although in some cases the access point may function as a repeater and have no direct link to the cable medium. Minimally, the access point receives, buffers, and transmits data between the WLAN and the wired network infrastructure. A single access point can support a small group of users and can function within a predetermined range.

In general, end users access the WLAN through WLAN adapters, which are commonly implemented as PCMCIA cards in notebook computers, ISA or PCI cards in desktop computers, or fully integrated devices within hand-held computers. WLAN adapters provide an interface between the client network operating system and the airwaves. Typically, the nature of the wireless connection is transparent to the network operating system.

In general operation, when a mobile terminal is powered up, it "associates" with an access point through which the mobile terminal can maintain wireless communication with the network. In order to associate, the mobile terminal must be within the cell range of the access point and the access point must likewise be situated within the effective range of the mobile terminal. Upon association, the mobile unit is effectively linked to the entire LAN via the access point. As the location of the mobile terminal changes, the access point with which the mobile terminal was originally associated may fall outside the range of the mobile terminal. Therefore, the mobile terminal may "de-associate" with the access point it was originally associated to and associate with another access point which is within its communication range. Accordingly, WLAN topologies must allow the cells for a given access point to overlap geographically with cells from other access points to allow seamless transition from one access point to another. One example of this "association" process is described extensively in IEEE 802.11.

It is common practice for most "association" algorithms to primarily rely on the signal strength between the client and the access point to determine whether to establish a communication link. However, there a drawbacks associated with relying solely on the signal strength parameter. Such drawbacks include inefficient use of bandwidth, high network latency and failure to account to for interference between clients and access points.

The present invention addresses these and other problems encountered in the prior art, to provide a system for increased throughput over a broad range of network topologies and conditions.

SUMMARY OF THE INVENTION

According to the present invention there is provided a system and method for use in a wireless network that uses multiple access points to support a large number of clients. The present invention is directed to optimizing the throughput of individual access points by measuring the response time of packets and establishing and maintaining an association with a new or existing client based on said response time.

The present invention provides for a wireless local area network comprising a cable medium conveying packets between a portable unit capable of transmitting and receiving packets through air, and a plurality of access points in a predetermined spaced-apart arrangement. Each of the plurality of access points are capable of transmitting and receiving packets through air within a limited area and are also coupled to the cable medium for transfer of packets to and from the cable medium. Each of the access points require registration of the portable unit with the access point before transferring packets between the portable unit and the cable medium. The method of associating the portable unit by placing and maintaining the portable unit in wireless communication with the cable medium for transfer of packets via the cable medium to and from the portable unit includes establishing an association between the portable unit with one of the plurality of access points controllers with an association process further including: transmitting through air from the portable unit a packet requesting a response from each of the plurality of access points; responding to the request for response from each of the access points that receives the packet from the portable unit, the responding comprising transmitting through air a response packet identifying the controller and indicating that the controller may register the portable unit; responding at the portable unit to receipt of one or more controller response packets by selecting one of the responding controllers based on the latency of the response time and transmitting through air from the portable unit a selection packet indicating the selected access point; responding at the selected access point to receipt of the selection packet by registering the portable unit with the selected access point; transmitting via the cable medium from the selected access point upon its association of the portable unit a registration-indicating packet indicating that the selected controller has registered the portable unit; responding to receipt of the registration-indicating packet at another of the access points with which the portable unit had been registered prior to registration with the selected controller by de-registering the portable unit from the other controller; and monitoring transmission of packets between the portable unit and the selected controller at the portable unit after registration of the portable unit with the selected controller thereby to detect transmission faults and re-initiating the registration process at the portable unit in response to transmission faults.

The present invention also directed to a system for wireless local area network communication for placing a portable unit capable of transmitting and receiving packets through air in communication with a cable medium of a network for transfer of packets via the cable medium to and from the portable unit. The system includes: a transmission and receiving means adapted for transmitting and receiving packets through air. A transferring means adapted for transferring packets to and from the cable medium. A control means adapted for registering the portable unit with the access point in response to receipt of a packet transmitted through air by the portable unit and requesting registration means adapted for requesting registration of the portable unit with the access point based on throughput between said access point and said portable unit, said control means being adapted to store packets received by the controller via the cable medium and addressed to the portable unit in the buffer for transmission to the portable unit upon registration of the portable unit with the controller. The control means is also adapted to respond to a packet received from another controller of the network and indicating registration of the portable unit with the other controller by transmitting any undelivered ones of the stored packets stored by the controller via the cable medium to the other controller.

Another aspect of the invention is to maintain optimized throughput when an access point is confronted with an external source of radio frequency interference.

Still another aspect of the invention is to maintain optimized throughput when the throughput associated with an access point falls below a certain threshold limit which can be set manually or by software to meet the requirements of a particular user or application.

BRIEF DESCRIPTION OF THE DRAWINGS

The invention may take physical form in certain parts and arrangements of parts, a preferred embodiment and system and method of which will be described in detail in this specification and illustrated in the accompanying drawings which form a part hereof, and wherein.

DETAILED DESCRIPTION OF THE INVENTION

It should be appreciated that a preferred embodiment of the present invention as described herein makes particular reference to the IEEE 802.11 Standard, and utilizes terminology referenced therein. However, it should be understood that reference to the IEEE 802.11 standard and its respective terminology is not intended to limit the scope of the present invention. In this regard, the present invention is suitably applicable to a wide variety of other communication systems which utilize a plurality operating frequencies for data transmission. Moreover, it should be appreciated that while the present invention has been described in connection with a wireless local area network (WLAN), the present invention is suitable for use in connection with other types of wireless networks, including a wireless wide area network (WWAN), a wireless metropolitan area network (WMAN) and a wireless personal area network (WPAN).

Figure 1:
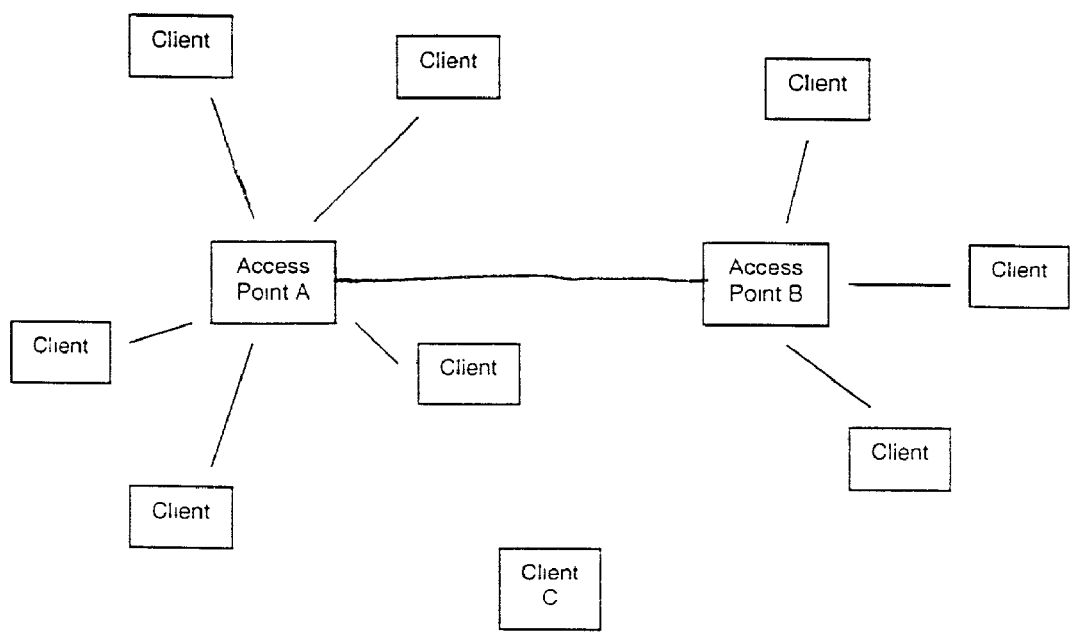
FIG. 1 is a schematic representation of a WLAN configuration.

The underlying concept of the present invention is shown in FIG. 1. In, FIG. 1, two access points, A and B, are supporting a number of clients. These clients could take the form of a portable unit (such as a laptop computer) or a hand-held unit (such as a personal digital assistant or infrared scanner). As illustrated, access point A is supporting five clients and access point B is supporting three clients. Client C is attempting to decide which access point to use. If all of the clients are generating the same amount of traffic, access point B would be the preferred choice because it is supporting only three clients while access point A is supporting five clients. Accordingly, a packet sent from Client C to each access point would take slightly longer to return from Access Point A than it would from Access Point B due to the greater bandwidth demands on Access Point A. Client C could measure this response time and correctly select Access Point B.

Now consider where four of the clients associated to Access Point A are generating transactional data (very sporadic, short bursts), and one client is performing a file download operation (constant traffic). Further, consider all of the clients associated with Access Point B are performing file downloads. According to the present invention, Access Point A would be the preferred selection because it has lower total bandwidth utilization, even though it is supporting more clients and the packet response time would therefore be faster.

In practice, this optimization occurs by Client C transmitting a packet to each access point in its cell. The packet transmitted from Client C would take slightly longer to return from Access Point B than Access Point A due to Access Point A's lower bandwidth utilization, Access Point A can respond more quickly than Access Point B. Thus, Access Point A would be the proper selection based on the present invention. In practice, Client C could either repeat this measurement for number of packets and make a decision based on the best average round trip response time or could immediately determine the best response time after one packet is sent.

Figure 2:
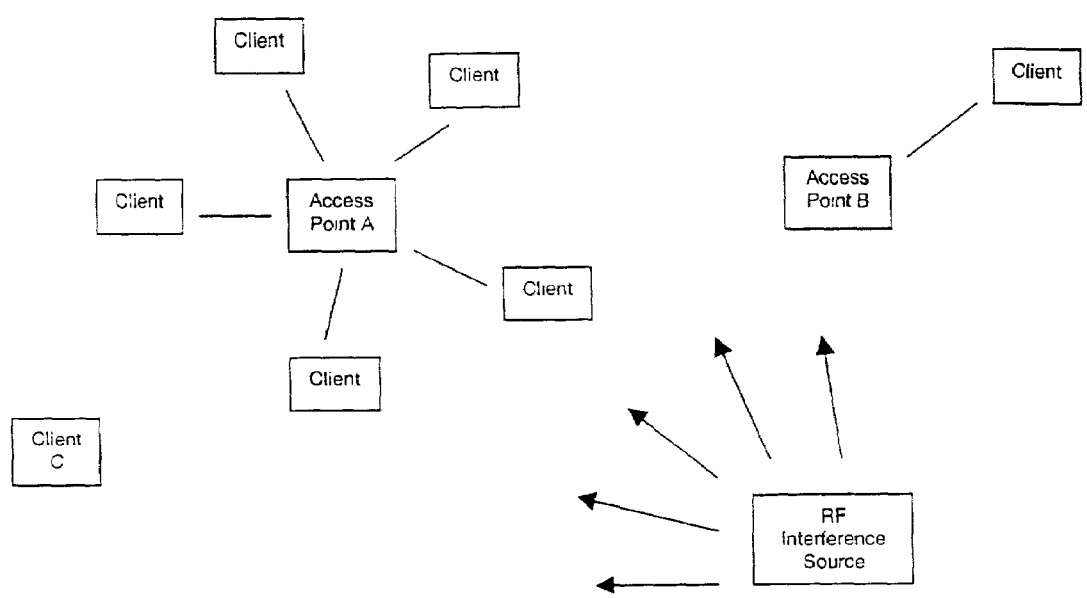
FIG. 2 is a schematic representation of a WLAN configuration in the presence of a an exemplar source of radio frequency.

FIG. 2 illustrates another embodiment of the invention when the WLAN is faced with a source of radio frequency ("RF") interference. From the foregoing discussion related to FIG. 1, it would appear that since Access Point B is only supporting one client and Access Point A is supporting five base clients, Access Point B would be the better choice. However, since the distance between Client C and Access Point B is much greater than the distance between Client C and Access Point A, the signal strength will be lower when using Access Point B. Also, consider the effect of the RF interference and that the signal quality from Access Point B may suffer. Thus, Access Point A could be the better choice in this situation. If Client C measured the response time of packets, it may see longer response times coming from Access Point B because of retries, even though Access Point B has a lower total bandwidth utilization and is able to respond quicker than Access Point A.

Figure 3:
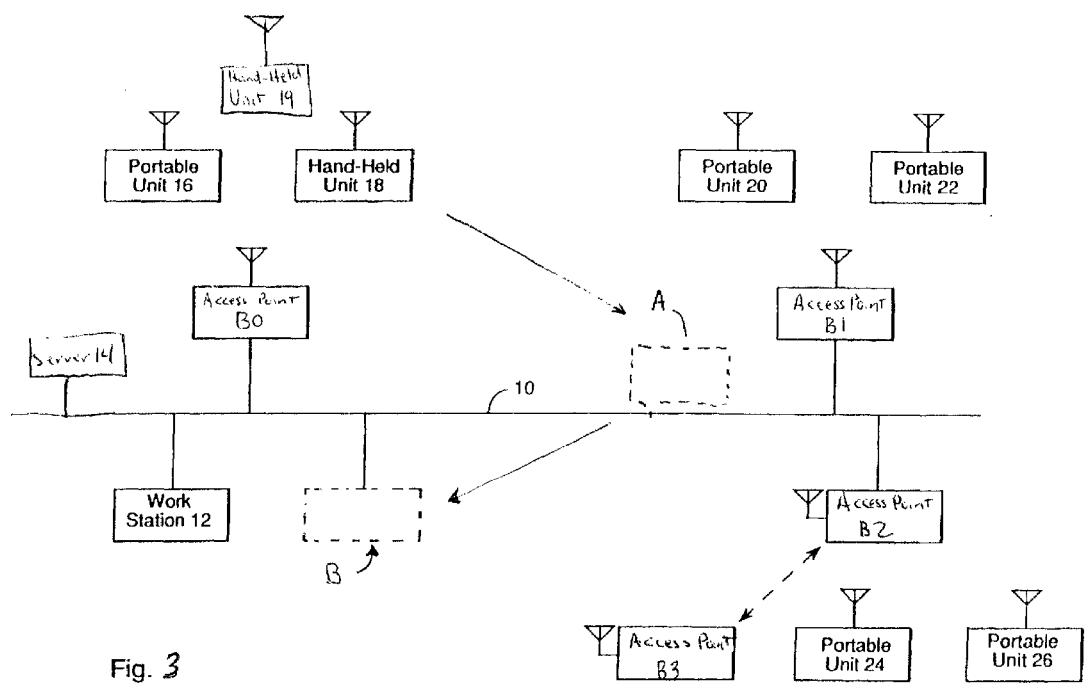
FIG. 3 is an exemplary representation of a network comprising access points coupled to a cable medium by radio links for transmission of data in packet form.

In FIG. 3 there is shown a typical WLAN used with the present invention. More specifically, FIG. 3 shows a WLAN system 2 generally comprised of a plurality of clients or communication devices including mobile stations (i.e., portable units 16, 20, 22, 24 and 26, and hand-held units 18 and 19) and a plurality of access points (also commonly referred to as base stations) B0, B1, B2, and B3. The access points may be connected to a hardwired network backbone or serve as wireless base stations. Access Point B3 has been termed an "access point" because it registers portable units in the same manner as the access points direct-wired to the cable 10 and offers the same basis registration services to the portable units. Access point B3 and each device to which it offers packet transferring services will, however, be registered with Access Point B2 to ensure that packets intended for or transmitted by devices associated with controller B3 are properly directed through the controller B3. Each access point can transmit and receive data in its respective cell. WLAN system 2 also includes a cable medium, namely, an Ethernet cable 10, along which all network data packets are transmitted when conveyed between any two network nodes. The principal nodes are direct-wired to the cable 10. These include a work station 12 and a network server 14, but may include a mainframe computer, communication channels, shared printers and various mass storage.

Several LANs are present in the WLAN system 2. These LAN's are not specifically indicated, but each is effectively defined by the area which a single access point can serve, given limited transmission power, and the devices within that area. One LAN is served by the Access Point B0 and currently contains a portable unit 16, such as a line-powered personal computer, and two battery-powered hand-held units 18 and 19. A second LAN is served by another Access Point B1 and currently contains two portable units 20 and 22. A third LAN is served by the other wired access point B2 and also contains two portable units 24 and 26. It should be noted that all transmission between devices in different LAN's is via the cable 10. Only transmissions between devices in a single LAN avoid using the cable 10, but such matters are not discussed extensively herein.

General operation of the network to accommodate movement of the hand-held unit 18 will now be described. The hand-held unit 18 is assumed to be registered initially with the Access Point B0. The Access Point B0 is also assumed to have undelivered packets addressed to the hand-held unit 18. The hand-held unit 18 is assumed then to move to position A, illustrated in phantom outline in FIG. 3, assumed to be beyond the transmission range of the Access Point B0. The hand-held unit 18 transmits polling packets at intervals, following its power-saving routine, with no response from the Access Point B0. After a predetermined number of attempts to poll the Access Point B0, the hand-held unit 18 causes transmission of a packet requesting registration with a network communication access point and providing its unique network address or identification. The registration-requesting packet is assumed in this instance to be received only by the Access Points B1 and B2.

It is assumed that both Access Points B1 and B2 can accommodate another device. Each then transmits a response packet addressed to the hand-held unit 18 and each reserves a registration slot for a predetermined period of time. Each response packet will include the access point's unique network address and will also indicate the number of hops from the access point to the cable 10. An access point connected directly to the cable 10 is regarded as 0 hops from the cable 10. An access point that functions as a repeater returns a positive number indicating the number of intervening access points (hops) required to couple it to the cable 10. Although the number of hops is not a primary concern of the present invention, it is perceived that this information may be required for compatibility with other WLAN solutions.

The hand-held unit 18 then responds to the access point response packets by selecting one of the responding Access Points B1 or B2. The selection is made by measuring the response time of packets from the respective access points and selecting the access point with the shortest response time (or highest throughput). Further assume that Portable Units 20 and 22 are performing file downloading operations and Portable Units 24 and 26 are performing transactional data operations. In the present case, the throughput associated with Access Point B2 will be much faster than Access Point B1. Therefore, the hand-held unit 18 then transmits a selection packet addressed to the Access Point B2 requesting registration. The selected Access Point B2 responds to the selection packet by registering the hand-held unit 18 and begins the process of monitoring the cable 10 for packets addressed to the hand-held unit 18. Access Point B0 also recognizes and conveys to the cable 10 any data packets received from the hand-held unit 18. The Access Point B1, not selected, but within range, does not respond to packets in the cable 10 addressed to the hand-held unit 18 and does not respond to any data packets received from the hand-held unit 18. No duplicate packets are produced within the cable 10 and no duplicate packets are transmitted through air.

Contemporaneously with registration, the selected Access Point B2 transmits via the cable 10 a multicast packet indicating its registration of the hand-held unit 18. The multicast packet contains a unique address to which all network access points. This is conveyed via the cable 10 to the Access Point B0 with which the hand-held unit 18 had been registered. The Access Point B0 responds by immediately de-registering the hand-held unit 18, discontinuing monitoring of the cable 10 for packets addressed to the hand-held unit 18 and disregarding further packets of a general nature transmitted by the hand-held unit 18 and possibly received by the Access Point B2. The Access Point B0 also responds by transmitting along the cable 10 any undelivered packets that are addressed to the hand-held unit 18. The newly selected Access Point B2 retrieves the packets from the cable 10 and stores them for re-transmission to the hand-held unit 18.

The hand-held unit 18 may then move to position B shown in phantom in FIG. 3. It is assumed now to be out of range of the Access Point B2 but within the range of Access Points B0 and B3. It is assumed that Portable Units 16 and 19 already associated with Access Point B0 are performing file download operations and that Access Point B3 is not associated with any portable units. Also, Access Point B2 is supporting minimal traffic from Portable Units 24 and 26. Since Access Point B3 functions as a repeater, the throughput associated with Access Point B2 must also be considered. After predetermined attempts to contact the Access Point B2 with polling packets, the hand-held unit 18 sends a packet requesting registration with an access point. Access Points B0 and B3 receive the request packet. Since Access Point B3 is functioning a repeater, it is not permitted to respond directly to the request packet, rather it must relay the request packet to its parent, Access Point B2. Access Point B2 will then respond to Access Point B3, which will in turn respond back to hand-held unit 18. This way, the network latency associated with using a repeater will be considered in the Access Point decision. Hand-held unit 18 then receives response packets only from the Access Points B0 and B3. The packet from Access Point B3 will indicate that the Access Point B3 is one hop away from the cable 10, and the additional latency associated with using a repeater will be included in the response time. Due to the heavy utilization of the bandwidth associated with Access Point B0 as compared to the low bandwidth utilization at Access Point B3, the response time from Access Point B0 will be longer than the response time from Access Point B3. The hand-held unit 18 will select Access Point B3 even though Access Point B3 is more hops away from a wired access point than Access Point B0. The hand-held unit 18 consequently selects the Access Point B3 according to the criteria specified above, and transmits a packet requesting registration with the Access Point B3. The Access Point B3 responds with response packet confirming registration, assuming no intervening registrations have taken the full capacity of the Access Point B3. If the capacity of the access point were somehow taken, the hand-held unit 18 would repeat transmission of its selection packet, assume transmission failure, and re-initiate the process of locating an appropriate communication access point. The Access Point B3 also transmits via the cable 10 a multicast packet addressed to access points indicating the registration, and the Access Point B1 de-registers the hand-held unit 18. The Access Point B1 transmits any undelivered packets addressed to the hand-held unit 18 along the cable 10, and the new Access Point B2 (since Access Point B3 acts as a repeater) detects and stores the packets. In effect, the Access Point B2 is fully conditioned to continue packet transmission from where the last access point lost communication with the hand-held unit 18.

From the above example, it is evident to one of ordinary skill in the art that different bandwidth utilization would have altered the selection of the access point. For instance, if Portable Units 16 and 19 were performing transactional data operations and Portable Units 24 and 26 were performing file download operations, then the hand-held unit 18 would select Access Point B0 based on measuring the response time of the access point.

General operation of the representative WLAN network 2, as discussed above, is known to those skilled in the art, and is more fully discussed in U.S. Pat. No. 5,276,680, which is fully incorporated herein by reference.

The present invention also contemplates reevaluating an association at various periods or upon certain occurrences during the association. For instance, it may be advantageous to periodically poll the available access points to determine whether another access point would have a higher throughput (or decreased response time). Also, it is contemplated that when response time falls below a certain threshold, the portable unit may seek another access point for improved performance. The need for such dynamic switching of access points may is required do in many cases to temporary sources of RF interference and the like.

It should be appreciated that a particular embodiment of the invention has been described and that further modifications may be made therein without departing from the spirit and principle of the invention or necessarily departing from the scope of the appended claims.

Having thus described the invention, it is now claimed:

1. In a wireless local area network comprising a cable medium conveying packets between a portable unit configured for transmitting and receiving packets through air, and a plurality of access points in a predetermined spaced-apart arrangement, each of the plurality of access points being configured for transmitting and receiving packets through air within a limited area and being coupled to the cable medium for transfer of packets to and from the cable medium, each of the plurality of access points requiring registration of the portable unit with the access point before transferring packets between the portable unit and the cable medium, a method of associating said portable unit by placing and maintaining the portable unit in wireless communication with the cable medium for transfer of packets via the cable medium to and from the portable unit, comprising:

establishing an association between the portable unit with one of the plurality of access points with an association process comprising:
(a) transmitting through air from the portable unit a packet requesting a response from each of the plurality of access points;
(b) responding to the request for response from each of the access points that receives the packet from the portable unit, the responding comprising transmitting through air a response packet identifying the access point and indicating that the access point may register the portable unit;
(c) responding at the portable unit to receipt of at least one access point response packets by selecting one of the responding access points based on the latency of the response time and transmitting through air from the portable unit a selection packet indicating the selected access point, wherein the latency of the response time is given the highest priority for selecting one of the responding access points;
(d) responding at the selected access point to receipt of the selection packet by registering the portable unit with the selected access point;
(e) transmitting via the cable medium from the selected access point upon its association of the portable unit a registration-indicating packet indicating that the selected access point has registered the portable unit;
(f) responding to receipt of the registration-indicating packet at another of the access points with which the portable unit had been registered prior to registration with the selected access point by de-registering the portable unit from the other access point; and, monitoring transmission of packets between the portable unit and the selected access point at the portable unit after registration of the portable unit with the selected access point thereby to detect transmission faults and re-initiating the registration process at the portable unit in response to transmission faults; and wherein the association process is re-initiated by the portable device when throughput falls below a minimum acceptable threshold;
wherein the minimum acceptable threshold is user selected.

2. The method of claim 1 wherein steps (a)–(c) of the association process are repeated a plurality times and an average response time is calculated by which said access point is selected for said association process.

3. The method of claim 1 further comprising the association process being re-initiated by the portable device at predetermined periods.

4. The method of claim 1 wherein the minimum acceptable threshold are dynamically allocable based on application demands.

5. The method of claim 1 wherein steps (a)–(g) of the association process are repeated whenever there is system degradation due to intermittent radio frequency interference.

6. A system for wireless local area network communication for placing a portable unit configured for transmitting and receiving packets through air in communication with a cable medium of a network for transfer of packets via the cable medium to and from the portable unit, comprising:
transmission means for transmitting packets through air;
receiving means for receiving packets through air;
transferring means for transferring packets to and from the cable medium;
control means for registering the portable unit with a selected access point in response to receipt of a packet transmitted through air by the portable unit and requesting registration means for requesting registration of the portable unit with a plurality of access points and selecting the selected access point based on throughput between the selected access point and said portable unit, wherein the throughput between the selected access point and the portable unit is given highest priority for selecting the selected access point;
wherein the requesting registration means includes means for re-initializing the requesting registration means when throughput falls below a minimum acceptable threshold; and
wherein the minimum acceptable threshold is user selected.

7. The system of claim 6 said requesting registration means includes means for re-initializing said requesting registration means at predetermined periods.

8. The system of claim 6 wherein the minimum acceptable threshold is also dynamically allocable based on application demands.

9. The system of claim 6 comprising the requesting registration means that includes an additional means for re-initializing the requesting registration means responsive to system degradation due to intermittent radio frequency interference.

10. The system of claim 6, wherein the requesting registration means further comprises:
means for operating the requesting registration means a plurality of times to produce a corresponding plurality of response times, and
means for calculating an average response time associated with each responding access point.

11. The system of claim 10, wherein the control means further comprises a means for selecting an access point with the fastest average response time.

12. An apparatus comprising:
a mobile unit operable to perform wireless communication;
wherein the mobile unit is operable to select an access point for association from a plurality of access points by transmitting a packet requesting a response from each of the plurality of access points and waiting for a response from each of the plurality of access points;
wherein the mobile unit is responsive to receiving the responses from each of the plurality of access points to determine the response time between the mobile unit and each of the plurality of access points;
wherein the mobile unit is responsive to determining the response time between the mobile unit and each of the plurality of access points to select the access point for association by giving highest priority to the response time between the mobile unit and the plurality of access points, wherein the selected access point has the lowest response time;
wherein the mobile unit is configured to re-initiate the association process responsive to the throughput falling below a minimum acceptable threshold; and
wherein the mobile unit is configured to receive the minimum acceptable threshold from an associated user.

13. The apparatus of claim 12 wherein the mobile unit is configured to re-initiate the association at predetermined periods.

14. The apparatus of claim 12 wherein the minimum acceptable threshold is also dynamically allocable based on application demands.

15. The apparatus of claim 12 wherein the mobile unit is configured to re-initiate the association when the system degrades due to intermittent radio frequency interference.

16. The apparatus of claim 12 wherein the mobile unit is configured to re-initiate the association a plurality of times to produce a corresponding plurality of response times.

17. The apparatus of claim 16 wherein the mobile unit is configured to calculate an average response time associated with each responding access point, wherein the selected access point has the fastest response time.

* * * * *